United States Patent [19]

Aonuma et al.

[11] Patent Number: 5,015,498

[45] Date of Patent: May 14, 1991

[54] METHOD FOR PREPARING A MAGNETIC RECORDING MEDIUM

[75] Inventors: Masashi Aonuma; Akira Kasuga; Haruo Masuda, all of Kanagawa, Japan

[73] Assignee: Fuji Photo Film Co., Ltd., Kanagawa, Japan

[21] Appl. No.: 462,321

[22] Filed: Dec. 27, 1989

Related U.S. Application Data

[63] Continuation of Ser. No. 235,715, Aug. 22, 1988, abandoned, which is a continuation of Ser. No. 77,052, Jul. 20, 1987, abandoned, which is a continuation of Ser. No. 690,070, Jan. 9, 1985, abandoned.

[30] Foreign Application Priority Data

Jan. 11, 1984 [JP] Japan .................................. 59-3160

[51] Int. Cl.$^5$ .............................................. B05D 5/12
[52] U.S. Cl. .................................. 427/132; 427/128; 427/130
[58] Field of Search ......................... 427/48, 127–132; 428/900, 694, 695

[56] References Cited

U.S. PATENT DOCUMENTS

| | | | |
|---|---|---|---|
| 3,437,510 | 4/1969 | Diaz ........................................ | 117/62 |
| 3,492,235 | 1/1970 | Matsumoto et al. ............. | 252/62.54 |
| 3,833,412 | 9/1974 | Akashi et al. ........................ | 117/240 |
| 4,005,242 | 1/1977 | Kopke et al. ........................ | 428/425 |

*Primary Examiner*—Bernard Pianalto
*Attorney, Agent, or Firm*—Sughrue, Mion, Zinn Macpeak & Seas

[57] ABSTRACT

A method for preparing a magnetic recording medium comprising a non-magnetic support having coated thereon a magnetic layer of a magnetic coating composition containing ferromagnetic metal particles and a binder, comprising at least (1) a step of mixing and dispersing ferromagnetic metal particles, a binder, and a solvent to prepare magnetic coating composition, (2) a step of adding and mixing lubricating agent therewith and (3) a step of coating the resulting magnetic coating composition on a non-magnetic support.

15 Claims, No Drawings

METHOD FOR PREPARING A MAGNETIC RECORDING MEDIUM

This is a continuation of application Ser. No. 07/235,715, filed Aug. 22, 1988, abandoned which is a continuation of application Ser. No. 07/077,052 filed July 20, 1987, now abandoned which is a continuation of application Ser. No. 06/690,070 filed Jan. 9, 1985, abandoned.

FIELD OF THE INVENTION

The present invention relates to a method for preparing a magnetic recording medium, and more particularly, to a method for preparing a magnetic recording medium containing ferromagnetic metal particles suitable for video tapes, audio tapes, tapes for computer, floppy discs and tapes for magnetic cameras.

BACKGROUND OF THE INVENTION

Magnetic recording media have recently been developed to be used for higher density recording, and attention has shifted from magnetic particles of iron oxide to magnetic metal particles during the development of magnetic particles. As a magnetic recording medium using ferromagnetic metal particles, compact cassette tapes for audio recording has been realized and are now commercially available and widely used (metal cassette tape for metal position use).

Ferromagnetic metal particles enables one to select coercive force from a wide range and have greater magnetic moment than the conventional magnetic particles. Therefore, they can be widely used for various purposes and it seems that ferromagnetic metal particles can be commercially employed in various fields for higher density recording.

However, in preparing magnetic recording media, ferromagnetic metal particles exhibit certain problems due to the large magnetic moment, which is a characteristic feature thereof. That is, since the surface of ferromagntic metal particles is highly active and a large magnetic moment, the ferromagnetic metal particles have poor dispersibility in the binder, and therefore prolonged dispersion treatment has been found necessary, which is industrially disadvantageous. Furthermore, after the dispersion treatment is terminated, the resulting dispersion (a magnetic coating composition) coagulates after it is allowed to stand for a period of time.

SUMMARY OF THE INVENTION

A first object of the present invention is to provide a method for preparing a magnetic recording medium which comprises dispersing a magnetic coating composition containing ferromagnetic metal particles in a short time without coagulation of the magnetic coating composition.

A second object of the present invention is to provide a magnetic recording medium prepared by coating a magnetic coating composition containing ferromagnetic metal particles with excellent dispersibility, and having high squareness ratio and excellent surface smoothness.

A third object of the present invention is to provide a magnetic recording medium having excellent running characteristics.

As a result of extensive research it has been found that the above problems can be solved by changing steps for preparing magnetic coating composition, i.e., by using a method comprising and dispersing binders, abrasives with ferromagnetic metal particles in the absence of lubricating agents, and then adding and mixing lubricating agents therewith immediately before the resulting coating compositon is coated on a non-magnetic support, in contrast to the conventional method in which all of binders, lubricating agents and abrasive agents are mixed with ferromagnetic metal particles simultaneously in a manner similar to the case where iron oxide particles are used conventionally and the mixture is dispersed.

Therefore, the present invention provides a method for preparing a magnetic recording medium comprising a non-magnetic support having coated thereon a magnetic layer of a magnetic coating composition containing ferromagnetic metal particles and a binder, comprising at least (1) a step of mixing and dispersing ferromagnetic metal particles, a binder, and a solvent to prepare a magnetic coating composition, (2) a step of adding and mixing lubricating agents therewith, and (3) a step of coating the resulting magnetic coating composition on a non-magnetic support.

DETAILED DESCRIPTION OF THE INVENTION

The lubricating agents used in the present invention include a fatty acid having from 12 to 18 carbon atoms ($R_1COOH$, wherein $R_1$ is an alkyl group having 11 to 17 carbon atoms) such as capric acid, caprylic acid, lauric acid, myristic acid, palmitic acid, stearic acid, oleic acid, elaidic acid, linolic acid, linolenic acid or stearolic acid; a metal soap of an alkali metal (La, Na, K and the like) or alkaline earth metal (Mg, Ca, Ba) of the fatty acid; lecithin, silicone oil, paraffin, wax, a silicone compound (e.g., myristic acid-modified polysiloxane), fatty acid esters consisting of a monobasic fatty acid having from 12 to 16 carbon atoms and a monohydric alcohol having from 3 to 12 carbon atoms, and fatty acid esters consisting of a monobasic fatty acid having 17 or more carbon atoms and a monohydric alcohol having from 21 to 23 carbon atoms in total including the carbon atoms of the fatty acid.

These lubricating agents can be used alone or in combination (and reference to "lubricting agent" herein is to be understood as encompassing combinations of lubricating agents as well as a single lubricating agent) in an amount of from 0.2 to 20 parts by weight, and preferably from 0.5 to 10 parts by weight, per 100 parts by weight of the ferromagnetic metal particles.

Of the lubricating agents the fatty acid is most effective.

The lubricating agents can be added within 12 hours, preferably within 6 hours, more preferably within 2 hours prior to coating the resulting magnetic coating composition.

It is important that the lubricating agent and the coating composition are mixed and dispersed in a short period of time; this can be accomplished using various mixing and kneading devices. Examples of such devices include a sand grinder, a monoaxial disperser, a biaxial disperser, a high speed mixer or a static mixer.

When the magnetic coating composition is hardenable, the lubricating agents can be added simultaneously with the hardening agents or can be added prior to or after the addition of the hardening agents within the above-described period of time.

Ferromagnetic particles, which have an active surface, readily react with a binder having a functional group and additives. It is highly probable that the lubricating agents (e.g., oleic acid), if dispersed simultaneously with a binder, easily react with ferromagnetic particles or absorb them. Accordingly, it is believed that the lubricating agents deteriorate dispersibility and lead to coagulation, and suffer decrease in their effect.

According to the present invention, ferromagnetic particles and binders are mixed and sufficiently dispersed in the absence of lubricanting agent, in order to avoid the above-noted deterioration, to improve the dispersibility, and to prevent coagulation which can occur while the magnetic coating composition is stored after dispersion. It is particularly preferred that lubricating agents are added and mixed with the magnetic coating composition immediately before the magnetic coating composition is coated on a non-magnetic support. The thus-obtained magnetic recording medium has excellent dispersibility, surface smoothness, higher squareness ratio and improved running properties.

Ferromagnetic metal particles that can be used in the present invention include conventionally known particles, and generally have a metal content of 75 wt % or more, preferably 80 wt % or more, and 50 wt % or more of the metal content is Fe and at least one metal which is selected from Co, Ni, Cr, Zn, Al and Mn can be contained, as disclosed, for example, in U.S. Pat. No. 4,246,316. Chemically combined hydrogen, oxygen, and nitrogen can be present in the particles. The average particle size in the short axis direction is from 150 to 500 Å, preferably from 200 to 450 Å, and the axial ratio is 3 to 20.

Saturation magnetization of the ferromagnetic metal particles is generally from 100 emu/g to 180 emu/g, and preferably from 120 emu/g to 170 emu/g. The coercive force Hc thereof is generally from 400 to 2,200 Oe. The specific surface area can be optionally selected from the range between 20 and 150 m$^2$/g. As the saturation magnetization becomes higher, and as the specific surface area becomes larger, the beneficial effects of the present invention become more apparent.

The saturation magnetization of the ferromagnetic metal particles can be adjusted by the composition of the ferromagnetic particles and by the surface treatment which is provided after the particles are reduced.

Air, oxygen, nitrogen, ammonium gas and various oxidizing agents can be used for the surface treatment.

Regarding the specific surface area, when ferromagnetic particles which are obtained by reducing goethite or acicular iron oxide with hydrogen are used, the specific surface area of the ferromagnetic metal particles can be adjusted by selecting the specific surface area, i.e., length, axial ratio and the shape of starting materials.

Binders can be used in an amount of 10 to 400 parts by weight, preferably 15 to 50 parts by weight based on 100 parts by weight of the ferromagnetic metal particles.

The binders used in the present invention include conventionally known thermoplastic resins, thermosetting resins, reactive resins and mixtures thereof.

The thermoplastic resins have a softening point of 150° C. or less, an average molecular weight of from 10,000 to 20,000 and a polymerization degree of about 200 to 500. Specific examples of the thermoplastic resins include copolymers of vinyl chloride and vinyl acetate, copolymers of vinyl chloride and vinylidene chloride, copolymers of vinyl chloride and acrylonitrile, copolymers of acrylate and acrylonitrile, copolymers of acrylate and vinylidene chloride, copolymers of acrylate and styrene, copolymers of methacrylate and acrylonitrile, copolymers of methacrylate and vinylidene chloride, copolymers of methacrylate and styrene, a urethane elastomer, nylonsilicone resins, nitrocellulose-polyamide resins, polyvinyl fluoride, copolymers of vinylidene chloride and acrylonitrile, copolymers of butadiene and acrylonitrile, polyamide resins, polyvinyl butyral, cellulose derivatives (cellulose acetate butyrate, cellulose diacetate, cellulose triacetate, cellulose propionate, nitrocellulose and the like), copolymers of styrene and butadiene, polyester resins, copolymers of chlorovinyl ether and acrylte, amino resins, various synthetic rubbers and the mixtures thereof.

The thermoplastic resins have a molecular weight of 200,000 or less in the state of the coating composition, and the molecular weight becomes infinite by a condensation reaction or an addition reaction after the coating composition is coated, dried and heated. Among those resins, resins that do not soften or melt until the resins are heat-decomposed are preferred. The preferred resins are phenol resins, epoxy resins, curable polyurethane resins, urea resins, melamine resins, alkyd resins, silicone resins, acryl based reactive resins, epoxypolyamide resins, nitrocellulose-melamine resins, a mixture of high molecular weight polyester resins and isocyanate prepolymer, a mixture of methacrylate copolymers and diisocyanate prepolymer, a mixture of polyester polyol and polyisocyanate, urea-formaldehyde resins, a mixture of low molecular weight glycol, high molecular weight diol and triphenylmethane triisocyante, polyamine resins and mixtures thereof. Such resins are disclosed e.g., in U.S. Pat. No. 4,135,016.

Abrasive agents, electroconductive carbon and the like can be used, if desired, when ferromagnetic metal particles and binders are mixed and dispersed.

Electroconductive carbon can be used in an amount of from 0.1 to 20 parts by weight, and preferably from 0.5 to 8 parts by weight, per 100 parts by weight of the ferromagnetic metal particles.

The abrasive agents are generally used agents such as fused alumina, silicon carbide, chromium oxide, corundum, TiOx (x=1.0 to 1.9), artificial corundum, diamond, artificial diamond, garnet, emery (main components: corundum and magnetite) and the like as described, for example, in U.S. Pat. Nos. 3,007,807, 3,041,196, 3,293,066, 3,630,910 and 3,687,725. These abrasive agents have an average particle diameter of from 0.05 to 5 μm, and preferably from 0.1 to 2 μm. The abrasive agents can be used in an amount of from 0.1 to 20 parts by weight per 100 parts by weight of ferromagnetic metal particles. Various kneading devices can be used for mixing, kneading and dispersing ferromagnetic metal particles, binders and abrasive agents. The devices include a two-roll mill, a three-roll mill, a ball mill, a pebble mill, a trommel, a sand grinder, Szegvari attriter, a high speed impeller diseprsing device, a high speed stone mill, a high speed impact mill, a disperser, a kneader, a high speed mixer, a homogenizer, an ultrasonic wave dispersing device, and the like.

Details regarding mixing, kneading and dispersing are explained in T. C. Patton *Paint Flow And Pigment Dispersion*, (1964, John Wiley & Sons) and in U.S. Pat. Nos. 2,581,414, and 2,855,156.

The methods for coating a magnetic recording layer on a support include an air doctor coating method, a blade coating method, an air knife coating method, a squeeze coating method, an impregnating method, a reverse roll coating method, a transfer roll coating method, a gravure coating method, a kissing coating method, a cast coating method, and a spray coating method, and other coating methods can also be used in this invention. Detailed explanations of coating methods is given in *Coating Engineering*, pages 253 to 277, published by Asakura Shoten, Mar. 20, 1971.

The organic solvents used for coating are ketones such as acetone, methyl ethyl ketone, methyl isobutyl ketone, or cyclohexanone; alcohols such as methanol, ethanol, propanol, or butanol; esters such as methyl acetate, ethyl acetate, butyl acetate, ethyl lactate or monoethyl ether of glycol acetate; glycol ethers such as ether, glycol dimethyl ether, glycol monoethyl ether or dioxane; tars (aromatic hydrocarbons) such as benzene, toluene or xylene; and chlorinated hydrocarbons such as methylene chloride, ethylene chloride, carbon tetrachloride, chloroform, ethylene chlorohydrin or dichlorobenzene. The solvents can be used in an amount of 0.5 to 10 parts by weight, preferably 1 to 5 parts by weight, per part of the ferromagnetic metal particles when the magnetic coating composition is coated.

The ferromagnetic metal particles of the magnetic layer coated on the support are, if desired, subjected to magnetic orientation as described, for example, in U.S. Pat. Nos. 1,949,840, 2,796,359, 3,001,891, 3,172,776, 3,416,949, 3,473,960 and 3,681,138, and the magnetic layer is dried.

The magnetic field for orientation is applied with alternating or direct current of from about 500 to 5,000 Oe. The drying temperature is generally from about 50° to 120° C., and the drying time is from abou 0.5 to 10 minutes.

The magnetic layer is, if desired, subjected to surface smoothing treatment and is slit to a desired shape to prepare the final magnetic recording medium.

The present invention will be illustrated in more detail by the accompanying Examples and Comparative Examples. In the Examples and Comparative Examples, all parts are by weight.

EXAMPLE 1

Nickel-adsorbed goethite was heat-treated at from 600° to 750° C. to prepare Fe-Ni acicular oxide, which was then reduced with hydrogen at 300° to 400° C. to prepare Fe-Ni ferromagnetic metal particles.

The ferromagnetic metal particles were soaked in toluene, then taken out into the air so that the toluene evaporated with oxygen density being adjusted to prepare dry Fe-Ni particles having a ferromagnetic magnetization of 148 emu/g, a coercive force Hc of 1270 Oe, and a BET specific surface area of 35 $m^2/g$: the Ni content of Fe-Ni was 5.4 wt %.

The magnetic coating composition was prepared using the thus-prepared ferromagnetic metal particles in the following composition.

| | |
|---|---|
| Ferromagnetic metal particles | 100 parts |
| Copolymers of vinyl chloride, vinyl acetate and vinyl alcohol (91/3/6 wt %; average molecular weight: about 420) | 10 parts |
| Polyester polyurethane (a reaction product of ethylene adipate with 2,4-tolylenediisocyanate, average styrene equivalent molecular weight: about 130,000) | 6 parts |
| Carbon black (average particle diameter: 20 $\mu$m) | 1 part |
| $\alpha$-$Al_2O_3$ (average particle diameter: 0.4 $\mu$m) | 3 parts |
| Methyl ethyl ketone | 150 parts |
| Cyclohexanone | 150 parts |

The above composition was placed in a ball mill and mixed and kneaded for 10 hours, then dispersed by a sand grinder for 2 hours to prepare a magnetic coating composition, which was designated as V-1.

Additionally, 4 parts of triisocyanate compound ("Coronate L", trademark for product manufactured by Nippon Polyurethane Co., Ltd.), 1 part of oleic acid and 1 part of myristic acid were added thereto and then were dispersed for 30 minutes by high speed shearing force, and were immediately coated on one side of a polyethylene terephthalate support (Ra: 0.05 $\mu$m at a cut-off value of 0.25 mm) having a thickness of 7.5 $\mu$m, which was subjected to magnetic orientation of about 3,500 Oe, heated, and dried.

The thus-prepared magnetic web was subjected to calendering treatment, and slit to a width of 3.8 mm to prepare an audio cassette tape. The tape sample was identified as T-1.

COMPARATIVE EXAMPLE 1

A magnetic coating composition was prepared using the same ferromagnetic metal particles of Example 1 in the following composition.

| | |
|---|---|
| Ferromagnetic metal particles | 100 parts |
| Copolymers of vinyl chloride, vinyl acetate and vinyl alcohol (91/3/6 wt %, the same as in Example 1) | 10 parts |
| Polyester polyurethane (molecular weight about 130,000, the same as in Example 1) | 6 parts |
| Carbon black (average particle diameter 20 $\mu$m) | 1 part |
| Oleic acid | 1 part |
| Myristic acid | 1 part |
| $\alpha$-$Al_2O_3$ (average particle diameter 0.4 $\mu$m) | 3 parts |
| Methyl ethyl ketone | 150 parts |
| Cyclohexanone | 150 parts |

The above composition was placed in a ball mill, mixed and kneaded for 10 hours, then dispersed for 2 hours by a sand grinder to prepare a magnetic coating composition. The resulting composition was identified as V-2. Further, 4 parts of triisocyanate compound ("Coronate L", trademark for product manufactured by Nippon Polyurethane Co., Ltd.) were added thereto and dispersed for 30 minutes with high speed shearing force to prepare a magnetic coating composition.

The thus-obtained composition was immediately coated on one side of a polyethylene terephthalate film (Ra 0.05 $\mu$m at a cut-off value of 0.25 mm) having a thickness of 7.5 $\mu$m, which was subjected to magnetic orienttion of about 3,500 Oe, heated, and dried. The thus-obtained magnetic web was slit to a width of 3.8 mm to prepare a cassette tape. The sample tape was identified as T-2.

EXAMPLE 2

The same procedure as in Example 1 was repeated, except that the magnetic coating composition V-1 of Example 1 was allowed to stand for 10 days before preparing the cassette tape. The sample tape was identified as T-3.

COMPARATIVE EXAMPLE 2

The same procedure as in Comparative Example 1 was repeated except that the magnetic coating composition V-2 prepared in Comparative Example 1 was allowed to stand for 10 days before preparing the cassette tape. The sample tape was identified as T-4.

EXAMPLE 3

The same procedure as in Example 1 was repeated except that the processing time in the ball mill was cut in half, i.e., to 5 hours, and that the dispersion in the sand grinder was only conducted for 1 hours, before preparing the cassette tape. The thus-obtained sample tape was identified as T-5.

COMPARATIVE EXAMPLE 3

The same procedure as in Comparative Example 1 was repeated, except that both oleic acid and myristic acid were used as a lubricating agent in amounts of 2 parts each, respectively, in preparing the cassette tape. The thus-obtained sample tape was identified as T-6.

The characteristics of the sample tapes T-1 to T-6 are shown in Tables 1 and 2.

manufactured by Suga Shikenki Co., Ltd.) at an angle of 45°.

(d) Electromagnetic properties

A cassette tape deck model "582" manufactured by Nakamichi Co., Ltd. was used (in the metal position).

0 dB in Table 2 is the value of a cassette tape "SR" for metal position use prepared by Fuji Photo Film Co., Ltd., which was used as a reference tape.

MOL is the maximum output level when the distortion degree was 3%. SOL is the saturated output level. Bias noise is the output level measured after audibility correction was made. Total dynamic range is represented by

[(MOL+SOL)/2−(bias noise)]

(e) $\Delta$ Br is demagnetization and is represented by $$\Delta Br = \left[ 1 - \frac{Br'}{Br} \right] \times 100.$$

Br' is the residual flux density measured after the sample tape was allowed to stand at 60° C. for 7 days.

(f) Surface roughness (Ra)

Surface roughness is shown as the center line average roughness at a cut off value of 0.25 mm, as defined in

TABLE 1

| Tape Sample No. | Coercive Force [HC]Oe | Residual Flux Density [Br] (gauss) | Squareness Ratio (Br/Bm) | Surface Gloss (%) | Surface Roughness Ra (μm) | Thickness of Magnetic Layer (μm) | Δ Br (%) |
|---|---|---|---|---|---|---|---|
| Example | | | | | | | |
| T-1 | 1150 | 3100 | 0.84 | 88 | 0.020 | 4.0 | 4.8 |
| T-3 | 1150 | 3150 | 0.84 | 90 | 0.018 | 4.0 | 5.0 |
| T-5 | 1150 | 3100 | 0.84 | 85 | 0.021 | 4.0 | 5.0 |
| Comparative Example | | | | | | | |
| T-2 | 1150 | 2770 | 0.80 | 70 | 0.027 | 4.0 | 8.2 |
| T-4 | 1160 | 2650 | 0.78 | 54 | 0.033 | 4.0 | 8.4 |
| T-6 | 1160 | 2880 | 0.82 | 74 | 0.024 | 4.0 | 8.0 |

Magnetic field Hm = 5 KOe

TABLE 2

| Tape Sample No. | 315 Hz Sensitivity | Sensitivity at 10 KHz | MOL 315 Hz | SOL 10 KHz | Bias Noise | Total Dynamic Range |
|---|---|---|---|---|---|---|
| Example | | | | | | |
| T-1 | +2.1 | +2.4 | +2.6 | +2.6 | 0.0 | +2.6 |
| T-3 | +2.3 | +2.8 | +2.8 | +3.0 | 0.0 | +2.9 |
| T-5 | +2.1 | +2.3 | +2.6 | +2.4 | 0.0 | +2.5 |
| Comparative Example | | | | | | |
| T-3 | +1.0 | +1.0 | +1.3 | +1.3 | −0.1 | +1.4 |
| T-4 | +0.5 | +0.6 | +0.8 | +0.8 | −0.1 | +0.9 |
| T-6 | +1.3 | +1.3 | +1.6 | +1.6 | 0.0 | +1.6 |

The various tape characteristics indicated in Tables 1 and 2 were measured or evaluated in the following manner:

(a) Saturation magnetization ($\sigma s$)

Saturation magnetization was measured at a magnetic field (Hm) of 10 KOe.

(b) Coercive force (Hc)

The coercive force of ferromagnetic metal particles was measured at a magnetic field (Hm) of 10 KOe, and that of the magnetic tapes was measured at the magnetic field (Hm) of 5 KOe.

(c) Surface gloss

The surface gloss was measured with a gloss meter (digital gloss meter "GK-45D", trademark for product "JIS-BO 601" of item 5.

It is clear from the results in Tables 1 and 2 that samples of Examples of the present invention have higher Br, higher squareness ratio and higher MOL at 315 Hz, better surface gloss, better surface roughness and higher SOL. These excellent characteristics are more remarkable as the magnetic coating composition is stored for a longer time, which is very advantageous from a practical viewpoint.

The effect of the present invention can be maintained even when the period for dispersion is made shorter, which is industrially advantageous.

In short, in accordance with the method of the present invention, the period for dispersion can be made shorter, the magnetic coating composition can be stored without being accompanied with by deterioration, which is industrially advantageous, and a magnetic recording medium having excellent characteristics can be provided.

The method of the present invention can be applied for preparing not only audio cassette tapes, but also for video tapes, and for digital audio tapes having shorter wavelengths to be recorded.

While the invention has been described in detail and with reference to specific embodiment thereof, it will be apparent to one skilled in the art that various changes and modifications can be made therein without departing from the spirit and scope thereof.

What is claimed is:

1. A method for preparing a magnetic recording medium comprising a non-magnetic support having coated thereon a magnetic layer of a magnetic coating composition containing ferromagnetic metal particles and a binder, comprising at least (1) a step of mixing and dispersing ferromagnetic metal particles, a binder, and a solvent in the absence of lubricating agents to prepare magnetic coating composition, (2) a step of adding and mixing a lubricating agent in an amount of from 0.2 to 20 parts by weight per 100 parts by weight of said ferromagnetic metal particles therewith and (3) a step of coating the resulting magnetic coating composition on a non-magnetic support, wherein said added lubricating agent is selected from the group consisting of a fatty acid and a salt of a fatty acid selected from the group consisting of a metal soap of an alkali metal or alkaline earth metal and wherein said ferromagnetic metal particles have a saturation magnetization of from 100 emu/g to 180 emu/g and a specific surface area of from 20 to 150 m$^2$/g.

2. A method as in claim 1, wherein the lubricating agent is used in an amount of from 0.5 to 10 parts by weight per 100 parts by weight of the ferromagnetic metal particles.

3. A method as in claim 2, wherein the lubricating agent comprises a fatty acid.

4. A method as in claim 3, wherein the lubricating agent is added according to step (2) within 12 hours prior to conducting step (3).

5. A method as in claim 2, wherein the lubricating agent is added according to step (2) within 6 hours prior to conducting step (3).

6. A method as in claim 3, wherein the lubricating agent is added according to step (2) within 2 hours prior to conducting step (3).

7. A method as in claim 6, wherein the lubricating agent comprises a fatty acid.

8. A method as in claim 1, wherein the lubricating agent is added according to step (2) within 12 hours prior to conducting step (3).

9. A method as in claim 1, wherein the lubricating agent is added according to step (2) within 6 hours prior to conducting step (3).

10. A method as in claim 1, wherein the lubricating agent is added according to step (2) within 6 hours prior to conducting step (3).

11. A method as in claim 1, wherein the lubricating agent is added according to step (2) within 2 hours prior to conducting step (3).

12. A method as in claim 1, wherein the lubricating agent is added according to step (2) within 2 hours prior to conducting step (3).

13. A method as in claim 1, wherein the lubricating agent is added with a curing agent.

14. A method as in claim 13, wherein the curing agent is an isocyanate compound.

15. A method for preparing a magnetic recording medium comprising a non-magnetic support having coated thereon a magnetic layer of a magnetic coating composition containing ferromagnetic metal particles and a binder, comprising at least (1) a step of mixing and dispersing ferromagnetic metal particles, a binder, and a solvent in the absence of lubricating agents to prepare magnetic coating composition, (2) a step of adding and mixing a lubricating agent in an amount of from 0.2 to 20 parts by weight per 100 parts by weight of said ferromagnetic metal particles therewith and (3) a step of coating the resulting magnetic coating composition on a non-magnetic support, wherein said added lubricating agent is selected from the group consisting of a fatty acid and a salt of a fatty acid selected from the group consisting of a metal soap of an alkali metal or alkaline earth metal and wherein said ferromagnetic metal particles have a saturation magnetization of from 100 emu/g to 180 emu/g and a specific surface area of from 20 to 150 m$^2$/g, wherein the lubricating agent is added according to step (2) within 12 hours prior to conducting step (3).

* * * * *